Sept. 29, 1942.  D. A. BEALL  2,297,344
DUMP CART
Filed March 18, 1942   2 Sheets-Sheet 2
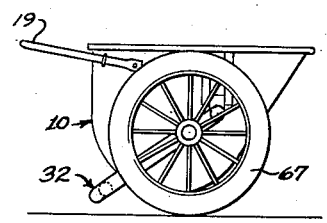
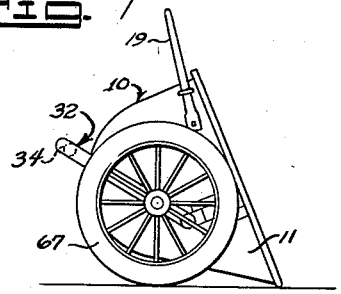
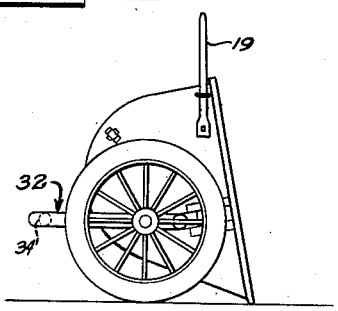
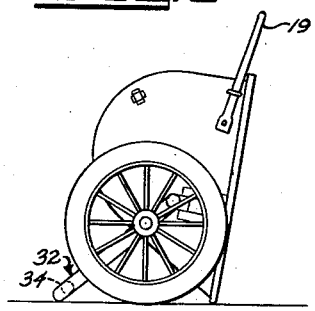
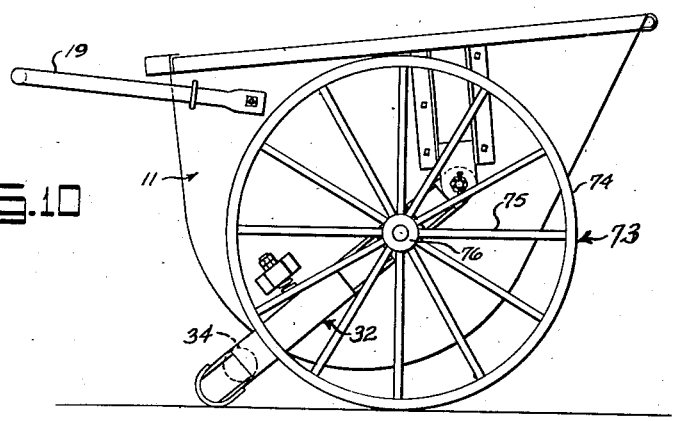
INVENTOR.
DAVID A. BEALL
BY
ATTORNEY Patented Sept. 29, 1942

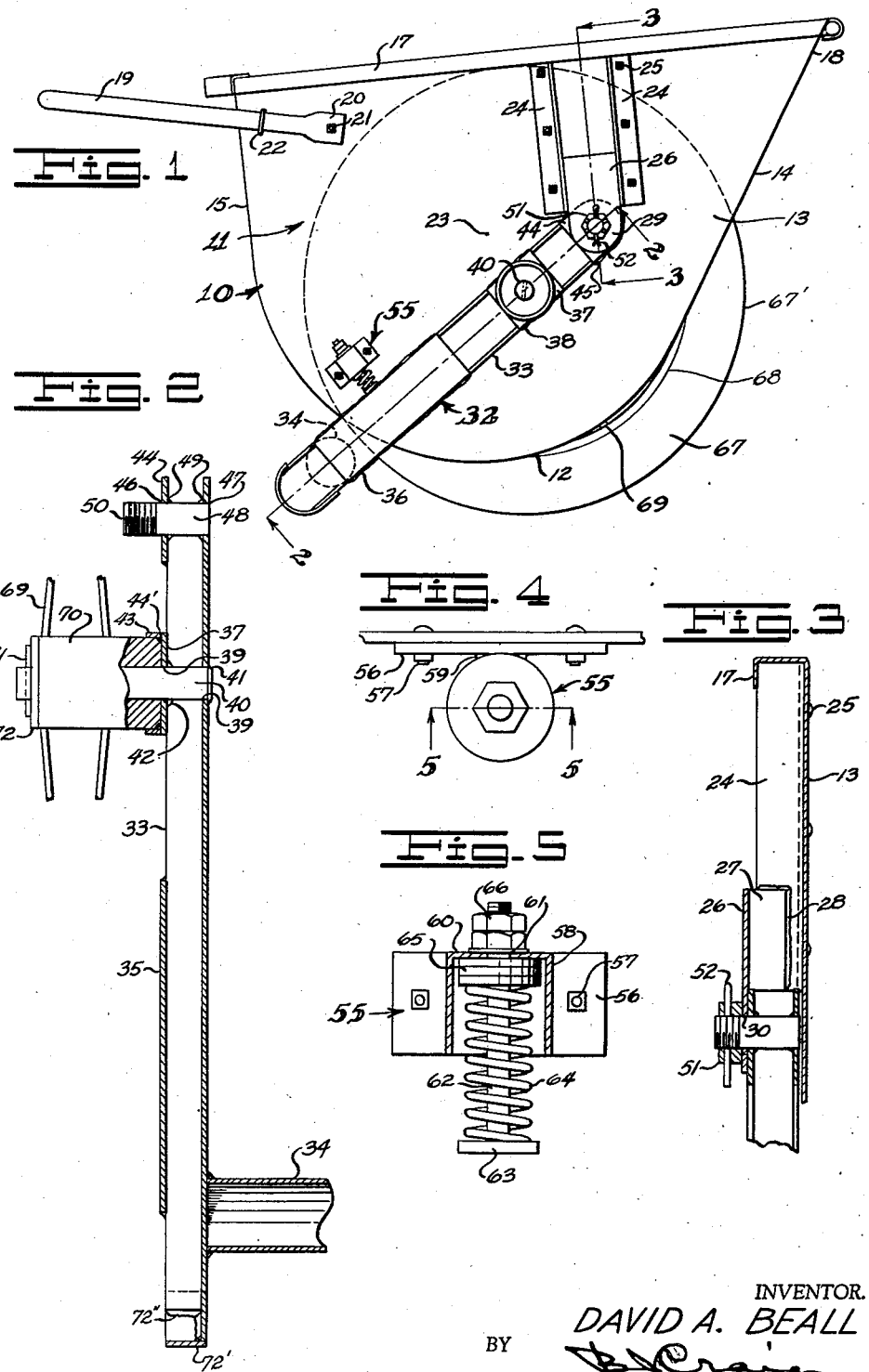

2,297,344

UNITED STATES PATENT OFFICE 2,297,344

DUMP CART

David A. Beall, Los Angeles, Calif., assignor to Garlinghouse Brothers, a copartnership Application March 18, 1942, Serial No. 435,136

9 Claims. (Cl. 298—5)

This invention relates to dump carts.

The general object of the invention is to provide an improved dump cart which is so constructed that a large load may be readily transported and may quickly and without undue effort be completely unloaded by an operator.

A further object of the invention is to provide a novel two wheel dump cart wherein the receptacle body of the cart is supported in a novel manner on a frame member and wherein the frame member carries the supporting wheels.

A further object of the invention is to provide a novel frame member for use in a dump cart.

An additional object of the invention is to provide a novel resilient cushion means for the receptacle of a dump cart.

Other objects and advantages of my invention will be apparent from the following description taken in connection with the accompanying drawings, wherein:

Fig. 1 is a side elevation showing my improved dump cart;

Fig. 2 is a section of the frame member taken on line 2—2, Fig. 1;

Fig. 3 is a section taken on line 3—3, Fig. 1;

Fig. 4 is a fragmentary plan view showing the stop member;

Fig. 5 is a section taken on line 5—5, Fig. 4;

Figs. 6, 7, 8 and 9 are diagrammatic views illustrating various positions assumed by the cart; and Fig. 10 is a side elevation showing a modification.

Referring to the drawings by reference characters I have shown my invention as embodied in a dump cart which is indicated generally at 10. As shown, the dump cart includes a receptacle 11 having an arcuate bottom 12 and spaced sides 13 which are planar. The receptacle includes a front 14 which is integral with the bottom 12 and is inclined upwardly and outwardly therefrom. The receptacle also includes a rear portion 15 which extends upwardly from the bottom.

The receptacle is preferably made from sheet metal and as shown includes a peripheral upper bead 17. The forward upper portion of the receptacle 18 provides a pouring spout. The rear of the receptacle is provided with a U-shaped handle 19 the ends 20 of which are held in place as by rivets 21 and by U-bolts 22.

The center of gravity of the receptacle with a truck load therein is indicated at 23. Each side 13 of the receptacle in advance of the center of gravity is provided with a pair of spaced parallel angle members 24 which are held to the sides by suitable fastening means such as bolts 25. Between each pair of angle members 24 I arrange a channel member 26 the flanges 27 of which are directed inwardly and engage the associated angle members 24 and are secured thereto by welding as at 28. The base of the channel 26 extends below the ends of the angle members 24 and is shown as rounded as at 29. The flanges of the channels 26 are removed below the angle members 24. The lower portion of each channel 26 is provided with an aperture 30.

A generally U-shaped supporting frame for the cart is indicated generally at 32. This frame includes a pair of side members 33 which are preferably channel members with the flanges of the channel members directed outwardly. The channel members are connected by a cylindrical transverse member 34, the ends of which are welded to the bases of the channels 33. Above the cylindrical cross-member 34, the flanges of the channel are connected by a plate 35 which is welded in place as at 36 and by a second plate 37 welded in place as at 38. Each plate 37 and the base of the channel adjacent thereto are provided with aligned apertures 39 through which a stub shaft 40 extends. The stub shaft is shown as held in place as by welding as at 41 and 42.

Surrounding the stub shaft 40 and disposed on each plate 37, I show a collar 43 which is held in place by welding as at 44′.

The upper end portion of each side member 33 is provided with a plate 44 held in place as by welding at 45. Each of the plates 44 is provided with an aperture 46 which aligns with aperture 47 in the channel. In the apertures 46 and 47 I arrange a shaft member 48 which is held in place by welding as at 49. The shaft 48 includes a projecting threaded outer end portion 50.

The shafts 48 are arranged in the apertures 30 in the channel members 26 with the bases of the channel member overlapping the plate 46 as shown in Fig. 1. A nut 51 held in place by a cotter pin 52 serves to hold the parts assembled.

In assembly the U-shaped member 32 is constructed and the channels 26 are secured to the angle members 24. Each shaft 48 is inserted in a hole 30 in the associated channel 26. The angle members 24 are then secured to the sides 13 of the receptacle by the bolts 25.

In order to prevent the rear end of the receptacle 13 from swinging downwardly I provide the receptacle with a pair of stop members indicated generally at 55. The stop member is shown in detail in Figs. 4 and 5 and includes a plate 56 which is secured by bolts 57 to the side of the receptacle.

A sleeve 58 is secured by a welding as at 59 to the plate 56. The sleeve has an end closure 60 which is provided with an aperture 61. A rod 62 extends through the aperture 61 and is provided with a head 63 at one end. One end of spring 64 arranged about the rod 62 engages the head 63. The other end of the spring engages washer-like spacing members 65 on the rod. The end one of the members 65 engages the closure 60. Nuts 66 threadedly engage the rod and serve to hold the parts assembled. The spacing members 65 are removable and the number of these spacing members determine the initial tension of the spring.

Mounted on each stub axle 40, I show a rubber tired wheel 67. Each wheel includes a tire 67', a rim 68, spokes 69 and a hub 70. The hub enters the collar 43, as shown in Fig. 2, and is held in place by a cotter pin 71 engaging a washer 72 on the stub shaft.

The lower end of each of the side members 33 is shown as provided with an arcuate weld plate 72' which is held in place by welding as at 72''. In Fig. 10, I show a modification of my invention, wherein the wheel indicated generally at 73 includes a metal rim 74, spokes 75 and a hub 76. The remainder of the structure disclosed in Fig. 10 is like the structure previously described.

In the use of my dump cart, the cart is loaded in the usual manner and is pushed while in the position shown in Fig. 6, wherein the wheel engages the ground and the U-shaped member is above the ground and with the stop member 55 engaging the frame 32. When at the dumping location, the operator lifts the handle 19 moving the receptacle to the position shown in Fig. 7, in which position most of the material will be discharged from the receptacle.

The operator then places one foot on the transverse member 34 and pushes downwardly on this member and at the same time pushes outwardly on the handle 19. Fig. 8 shows an intermediate position in this operation with the receptacle being further tilted. The completion of the operation is shown in Fig. 9 wherein the lower end of the frame member contacts the ground and the receptacle is fully tilted so that the material in the receptacle is completely discharged.

The construction is such that the cart may be very easily pushed when loaded and may be completely dumped with a minimum of effort.

Having thus described my invention, I claim:

1. In a dump cart, a substantially U-shaped frame, a receptacle including spaced sides, means pivotally supporting said frame on said receptacle, a shaft on each side of the frame, a wheel on each shaft, said frame being rearwardly directed, a support on each side of the receptacle, and a resilient stop member on each support, each stop member including a portion disposed in the path of the frame.

2. In a dump cart, a substantially U-shaped frame, a receptacle including spaced sides, means pivotally supporting said frame on said receptacle, a shaft on each side of the frame below its pivotal support, a wheel on each shaft, said frame being rearwardly and downwardly directed, a plate on each side of the receptacle, a sleeve mounted on each plate, each sleeve having a closed apertured end, a rod slidable through said aperture, each rod having a head thereon disposed in the path of the frame, a spring on each rod, and having one end engaging said head, spacing members on said rod and engaging said spring and said end fastening means on the rod at the end remote from said head.

3. In a dump cart, a U-shaped frame member, a receptacle including spaced sides, a channel member mounted on each side, the flanges of each channel member being inwardly directed, each leg of said frame member having an outwardly projecting pin therein, each of said channel members having an aperture adjacent to its end and receiving one of said pins, fastening means on each pin, an outwardly directed stub shaft on each side member below the adjacent pin, a wheel on each stub shaft, the center of gravity of said receptacle when in conveying position being in the rear of and above said stub axle, and means to limit the downward movement of the rear end of the receptacle relative to the frame member.

4. In a dump cart, a U-shaped frame comprising spaced side members and a transverse member, a receptacle including spaced sides, bottom, front, rear and ends, a pair of spaced angle members mounted on each side, a channel member arranged between and secured to the angle members, each of said frame members having an outwardly projecting pin therein, each of said channel members having an aperture adjacent to its end and receiving one of said pins, fastening means on each pin, an outwardly directed stub shaft on each side member, and below the associated pin a wheel on each stub shaft, the center of gravity of said receptacle, when in conveying position, being in the rear of and above said stub axle, and means to limit the downward movement of the rear end of the receptacle.

5. In a dump cart, a frame comprising a pair of spaced side members and a transverse bottom member connected to the side members, a receptacle including spaced sides, bottom, front, rear and ends, a pair of spaced angle members mounted on each side, a channel member arranged between the angle members, means securing said angle members and channel members in place, each of said frame members having an outwardly projecting pin therein, each of said channel members having an aperture adjacent to its end and receiving one of said pins, fastening means on each pin, an outwardly directed stub shaft on each side member and below the adjacent pin, a wheel on each stub shaft, the center of gravity of said receptacle, when in conveying position, being in the rear of and above said stub axle, and means to limit the downward movement of the rear end of the receptacle.

6. In a dump cart, a frame comprising a pair of spaced side members and a transverse bottom member connected to the side members, a receptacle including spaced sides, bottom, front, rear, and ends, a pair of spaced angle members mounted on each side, a channel member having inwardly directed flanges arranged between the angle members thereon, means securing said angle members and channel members in place, said angle members terminating at their lower end above the lower end of the channel members, the flanges of each channel member terminating above the end of the base thereof, each of said frame side members having an outwardly projecting pin therein, each of said channel members having an aperture adjacent to its end and receiving one of said pins, fastening means on each pin and engaging the associated side member, a stub shaft secured to each side member, a wheel on each stub shaft, and a stop member on each side of the receptacle and in the rear of the stub axles and positioned to engage the upper face of the frame side members when the receptacle is in conveying position.

7. In a dump cart, a frame comprising a pair of spaced side members and a transverse bottom member connected to the side members, a receptacle including spaced sides, bottom, front, rear, and ends, a pair of spaced angle members mounted on each side, a channel member having inwardly directed flanges disposed upon each side member and arranged between the angle members thereon, means securing said angle members and channel members in place, said angle members terminating at their lower end above the lower end of the channel members, the flanges of each channel member terminating above the end of the base thereof, each of said frame side members having an outwardly projecting pin therein, each of said channel members having an aperture adjacent to its end and receiving one of said pins, fastening means on each pin and engaging the associated side member, said frame side members having holes therein spaced below said pins, a stub shaft secured in each hole, a wheel on each stub shaft, a stop member on each side of the receptacle and in the rear of the stub axles and positioned to engage the upper face of the frame side members when the receptacle is in conveying position and a handle on the rear end of said receptacle.

8. In a dump cart, a frame comprising a pair of spaced side members and a transverse bottom member connected to the side members, a receptacle including spaced sides, bottom, front, rear, and ends, the bottom of said receptacle being arcuate in cross section and the front of said receptacle flaring upwardly and outwardly from the bottom thereof, a pair of spaced angle members mounted on each side, a channel member having inwardly directed flanges disposed upon each side member and arranged between the angle members thereon, means securing said angle members and channel members in place, said angle members terminating at their lower end above the lower end of the channel members, the flanges of each channel member terminating above the end of the base thereof, each of said frame side members having an outwardly projecting pin therein, each of said channel members having an aperture adjacent to its end and receiving one of said pins, fastening means on each pin and engaging the associated side member, said frame side members having holes therein spaced below said pins, a stub shaft secured in each hole, a wheel on each stub shaft, the center of gravity of said receptacle, when in conveying position, being in the rear of and above said stub axle and the bottom of said receptacle being above the ground level when the receptacle is in conveying position, a stop member on each side of the receptacle and in the rear of the stub axles and positioned to engage the upper face of the frame side members when the receptacle is in conveying position and a handle on the rear end of the receptacle.

9. In a dump cart, a substantially U-shaped frame comprising a pair of side members and a transverse member, said U-shaped frame being rearwardly and downwardly directed when the cart is at rest, said transverse member being normally disposed adjacent to the ground line, a receptacle including spaced sides and bottom, front and rear portions, means pivotally supporting the free ends of said frame side members on said receptacle sides, an outwardly directed stub shaft on each frame side member below and in the rear of the frame member pivotal support, a wheel on each stub shaft, the center of gravity of said receptacle when in conveying position being in the rear of and above said stub axle and the bottom of said receptacle being above the ground level when the receptacle is in conveying position, a stop member projecting from each side of the receptacle and in the rear of the stub axles and positioned to engage the frame side members when the receptacle is in conveying position and a handle on the rear end of the receptacle.

DAVID A. BEALL.